United States Patent [19]
Partridge et al.

[11] Patent Number: 5,529,121
[45] Date of Patent: Jun. 25, 1996

[54] PROCESS FOR RECOVERY AND SEPARATION OF VOLATILE AND NON-VOLATILE AND NON-VOLATILE COMPOUNDS

[76] Inventors: Clifton S. Partridge, P.O. Box 17855, Natchez, Miss. 39122; Blakeslee A. Partridge, 132 Sunnycrest Dr., Ridgeland, Miss. 39157

[21] Appl. No.: 392,480

[22] Filed: Feb. 15, 1995

[51] Int. Cl.$^6$ ............................................. E21B 43/34
[52] U.S. Cl. ............................................. 166/267; 166/370
[58] Field of Search ..................... 166/370, 371, 166/267, 266

[56] References Cited

U.S. PATENT DOCUMENTS

| | | | |
|---|---|---|---|
| 4,874,403 | 10/1989 | Toshihara et al. | 55/55 |
| 4,982,788 | 1/1991 | Donnelly | 166/370 X |
| 5,050,676 | 9/1991 | Hess | 166/267 |
| 5,076,360 | 12/1991 | Morrow | 166/267 |
| 5,172,764 | 12/1992 | Hajali et al. | 166/370 X |
| 5,387,057 | 2/1995 | DeLoach | 166/370 X |
| 5,441,365 | 8/1995 | Duffney et al. | 166/370 X |

OTHER PUBLICATIONS

Driscoll, Grounwater and Wells, Second Edition, pp. 507 to 513.
Well Design: Drilling and Production, pp. 368 to 376.

*Primary Examiner*—Stephen J. Novosad

[57] ABSTRACT

A process for contaminant removal from the ground or ground water involves employing a simple "dry" vacuum device (100) to apply a vacuum to a conventional well (60) for the recovery and separation of vapor contaminants, "free product", and contaminated water. The process employs a staged separation system for separation of the liquid phases, removal of contaminants from water, and vapor separation. The staged separation system allows the use of an "off the shelf" centrifugal (26) pump for effluent discharge. The process introduces additional dispersed air bubbles into the contaminated water which will aid in removal of contaminants. The process alternately employs a hydrophobic filter (56) to recover large amounts of "free product".

7 Claims, 2 Drawing Sheets

Total Fluid Recovery Unit

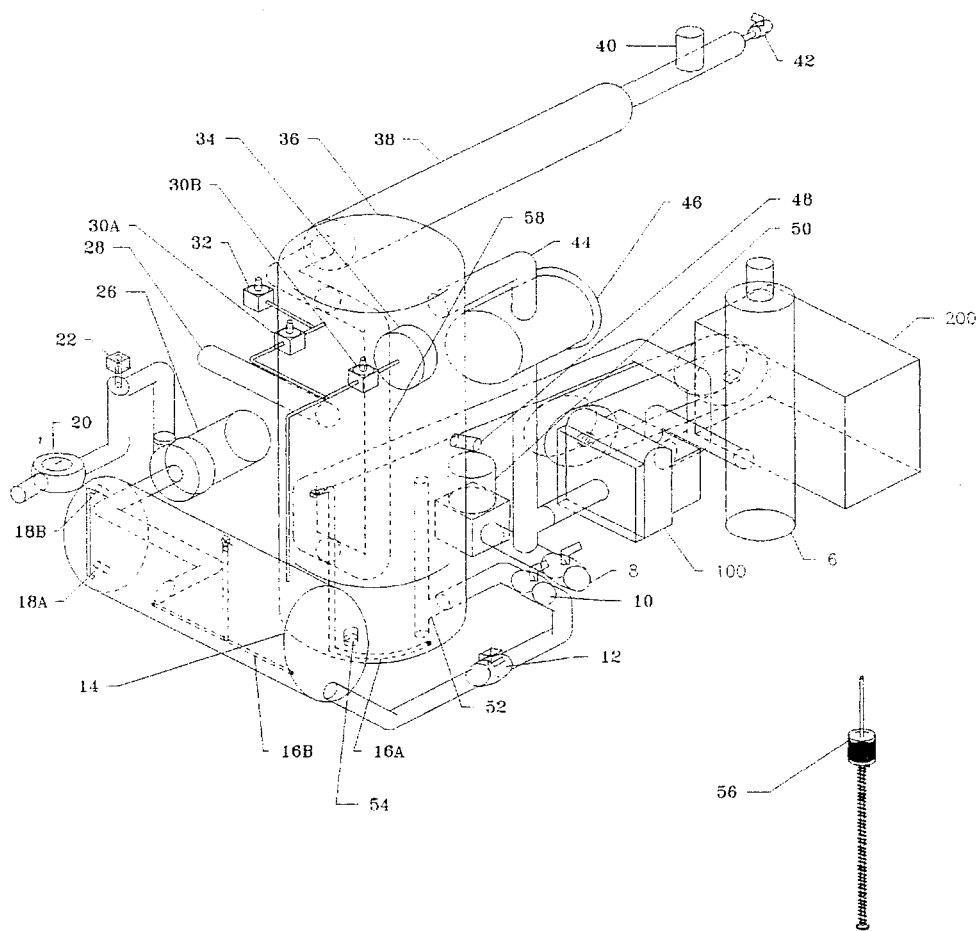
FIGURE 1, Total Fluid Recovery Unit
FIGURE 2, Hydrophobic Filter

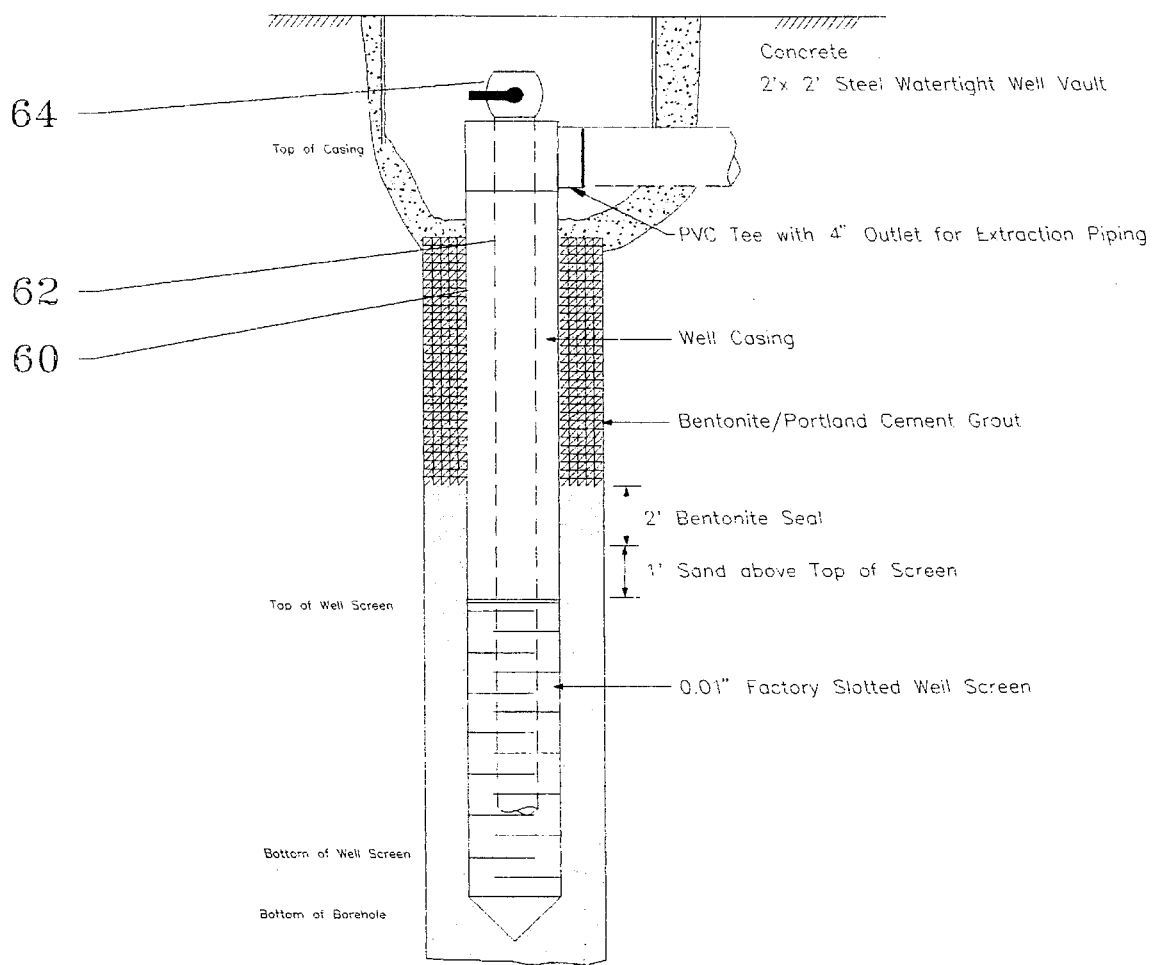
FIGURE 3, TYPICAL RECOVERY WELL

PROCESS FOR RECOVERY AND SEPARATION OF VOLATILE AND NON-VOLATILE AND NON-VOLATILE COMPOUNDS

BACKGROUND

1. Field of Invention

This invention relates to the field of contamination removal, specifically the removal and separation of Volatile Organic Compounds ("VOCs") and Non-VOCs from the ground, or ground water, or both.

2. Description of Prior Art

VOCs and Non-VOCs are placed in the ground from time to time. Once these compounds enter the ground, they disperse downward through the vadose(unsaturated) zone to the water table. While these compounds are falling to the water table, they leave a residual trail of the compound behind in the vadose zone. When the compounds reach the water table they may form a layer on top or dissolve slightly into the water, or both.

The removal of VOCs and Non-VOCs has been accomplished in many ways. A common method is to dig the compounds up with the associated contaminated soil and ship off-site to a treatment facility. The compound can be "waterflooded" to the surface by filling the vadose zone with water and leaching the compound to the surface. U.S. Pat. No. 4,323,122 (Kropik, April, 1982) proposed the use of a vacuum applied to a bore hole open to the water table with the assumption that the lighter than water contaminant (gasoline) would vaporize and be drawn off at and around the water table level. This process may be useful for vapor recovery, but does not address the recovery and separation of contamination from the water.

U.S. Pat. No. 5,050,676 (Hess, et al, September, 1991) proposes the application of sufficient vacuum, by means of a liquid ring vacuum pump, to a borehole or well coupled with air inlet wells to cause the liquid and gaseous phases to come to the surface in a common stream for further separation and treatment. This method requires additional inlet wells, a source of water to secure vacuum with the liquid ring vacuum pump, an expensive pump for effluent discharge, and liquid particulate filtration. In a continuation or improvement of the U.S. Pat. No. 5,050,676, U.S. Pat. No. 5,076,360 (Morrow, December, 1991) proposes a priming method when the borehole or well will not extract liquids. In accordance with the present invention, which exploits total fluid recovery and separation of VOC and Non-VOC contaminants, a simple "dry" vacuum device applies vacuum to a conventional well.

OBJECTS AND ADVANTAGES

The herein described invention has several advantages over the prior art. They are:

(a) the use of a "dry" vacuum pump which eliminates the use of a complicated wet filter arrangement and the maintenance of the wet filter arrangement, (b) the use of a "dry" vacuum pump which eliminates the need for make-up water and the solenoid valves and other regulators associated with the liquid ring pump, (c) the use of second stage or pumping vessels to eliminate the need for complicated and expensive liquid discharge pumps, (d) the use of on board flotation or "sparging" in the first stage and second stage separators for stripping VOCs and Non-VOCs from the produced water, (e) the alternate use of a hydrophobic filter for separation of large amounts of VOCs and Non-VOCs in the first stage separator, (f) the use of a recovery well or wells of conventional water or monitoring design, which allows existing wells to be converted to recovery wells.

DRAWING FIGURES

In the drawings, closely related components have the same number but different alphabetic suffixes. There is seen in the drawings a form of the invention which is presently preferred (and which represents the best mode contemplated for carrying the invention into effect), but it should be understood that the invention is not limited to the precise arrangements and instrumentalities illustrated.

FIG. 1 shows the Total Fluid Recovery ("TFR") unit in perspective view.

FIG. 2 shows the hydrophobic filter.

FIG. 3 shows a typical recovery well configuration.

REFERENCE NUMERALS IN DRAWING

100 dry vacuum pump
6 intake silencer for vacuum pump
10 shut off valve
14 second stage separator
16B second stage sparger
18B high level pump controller
22 vacuum breaking valve
26 water pump
30A equalizer valve
32 "free product" equalizing valve
36 first stage separator
40 exhaust discharge
44 vapor piping
48 high liquid shutdown controller
52 water transfer suction
56 hydrophobic filter
60 typical recovery well
64 air line valve
200 prime mover
8 throttle valve
12 separation valve
16A first stage sparger
18A low level pump controller
20 water meter
24 water pump suction line
28 TFR intake
30B bleeder valve
34 Intake filter/silencer
38 discharge silencer
42 discharge sampling valve
46 intake filter
50 vacuum relief valve
54 Non-VOC intake
58 heat exchange/discharge piping
62 air line

DESCRIPTION

FIG. 1, Total Fluid Recovery ("TFR") Unit, shows the TFR unit in perspective view. There can be seen a dry vacuum pump 100 coupled to a prime mover 200 by means of a rotational energy connecting element. Prime mover 200 is typically an electric motor, however a natural gas, diesel, or gasoline engine may by used. Vacuum pump 100 typically requires cooling which is supplied through an intake silencer 6. The gas section of a first stage separator 36 is connected to vacuum pump 100 by a vapor piping 44. Vapor piping 44 has an inline intake filter 46 to keep airborne solids from entering vacuum pump 100. A throttle valve 8 is connected to the vapor piping on one end of a tee with a vacuum relief valve 50 on the other side of the tee. Both throttle valve 8 and intake silencer 6 have intake filter/silencers of the same "off the shelf" construction as intake filter/silencer 34, but are not shown for simplification of FIG. 1.

First stage separator 36 is hydraulically connected to a second stage separator 14 by piping with a separation valve 12. A shut off valve 10 is between separator 36 and valve 12 to isolate separators for cleaning. A water transfer suction 52 is inside separator 36. Separation valve 12 may be a controlled valve or in the current preferred configuration, a simple check valve. Separators 36 and 14 have spargers 16A and 16B respectively. Spargers are used to introduce an abundance of dispersed small air bubbles into the separators. One skilled in the art understands that this air will further separate contaminants from water. Separator 36 can also be equipped with a hydrophobic filter 56, for recovery of large amounts of VOCs or Non-VOCs which are routed through a Non-VOC intake to another separator (not shown).

Second stage separator 14 is also connected to first stage separator 36 by piping with an equalizer valve 30A and a bleeder valve 30B. Valves 30A and 30B are "off the shelf" and can be pneumatic or electrically operated. The current preferred component is a solenoid type electrically controlled valve and valve 30A is normally open and valve 30B is normally closed. Bleeder valve 30B has an intake filter/silencer 34. Between equalizer valve 30A and separator 36 is a "free product" equalizing valve 32, which is either a manually operated valve or a three-way control valve or valves similar to control valves 30A and 30B. A water pump 26 is connected to separator 14 by a water pump suction line 24 and controlled by low level pump controller 18A and high level pump controller 18B. The current preferred type of water pump is a simple centrifugal pump coupled with an electric motor and is typically acquired "off the shelf" already coupled. Piping connects water pump 26 to a water meter 20 with a vacuum breaking valve 22. A TFR intake 28 connects the TFR unit to piping connected to a recovery well 60. Well 60 is of typical monitoring well construction, obvious to those skilled in the art. Those skilled in the art recognize that the particular well diameter, screened interval, and screen placement are site specific and subject to numerous geologic, engineering, and location variables. Well 60 is equipped with an air line 62 and an air line valve 64. Air line 62 and air line valve 64 are familiar to those skilled in the art and have been in use for aeration or air lifting for over 100 years.

Vacuum pump 100 is equipped with a heat exchange/discharge piping 58 which passes through separator 36 to a discharge silencer 38. An exhaust discharge 40 is out of a tee and is threaded for either a stack or piping for further treating. The tee also has a discharge sampling valve 42 to monitor vapor effluent.

The TFR unit also has a high liquid shut down controller 48 located at a height just below the corresponding height of TFR intake 28. Controller 48 is installed to keep liquids out of vacuum pump 100.

OPERATION

TFR intake 28 is connected with collapse resistant piping to well 60. Throttle valve 8 and air line valve 64 are placed in the full open position. Vacuum pump 100 is placed in service by applying electric power to prime mover 200. Both throttle valve 8 and air line valve 64 are then adjusted for maximum vacuum and optimum lift air use, respectively. Those skilled in the art understand that throttle valve 8 is ideally fully closed for maximum efficiency.

Once well 60 begins producing fluids to the TFR unit, first stage separator 36 may begin to fill with "free product" or contaminated water, or both, and vapors. One skilled in the art will see that produced vapors will be entrained with air produced through the vadose zone and lift air from air line 62. For a typical VOC contaminant, sparger 16A will continuously clean the produced water. As the liquid phases fill separator 36 above the water transfer suction 52, water will gravity feed through piping and the separation valve 12 to second stage separator 14.

When separator 14 fills to the level that activates high liquid pump controller 18B, a pump cycle begins. The pump cycle consists of two operations. The first is the closing of equalizer valve 30A and the opening of bleeder valve 30B. Once these valves cycle, separator 14 is relieved of its state of vacuum and brought up to ambient pressure. Separation valve 12 closes when vacuum is relieved from separator 14. This allows the use of a simple check valve for separation valve 12 since water will tend to flow back to separator 36, or from high pressure to low pressure. In the preferred embodiment, a simple check valve is used since it is not prone to plugging or fowling with sediments. Unlike prior art, the water stream does not require filtering of sediments since the water does not enter vacuum pump 100. The second operation is the application of electric power to water pump 26 to pump water out of separator 14.

Once water pump 26 pumps enough water out of separator 14 to lower its water level down to activate low level pump controller 18A, the above cycle reverses. Water pump 26 stops pumping, bleeder valve 30B goes back to the normally closed position, and equalizer valve 30A goes back to the normally open position. Once valves 30A and 30B are back to normal positions, separators 36 and 14 will again be in pressure equilibrium and water resumes gravity feed from separator 36 to 14. It is also important to note that valves 30A and 30B are only in contact with gaseous phases. The unique simplicity of the system is obvious to those skilled in the art.

Both spargers 16A and 16B are site adjusted for optimum efficiency. When a Non-VOC contaminant is being recovered or when a large amount of VOC contaminant is being recovered, first stage sparger 16A is taken out of service and a hydrophobic filter 56 is placed in separator 36. Those skilled in the art understand that filter 56 will capture only floating contaminants, and will be used for recovery of large amounts of VOCs or Non-VOCs such as diesel or jet fuel. Hydrophobic filter 56 will be piped through a separation valve similar to separation valve 12 and into a vessel in vacuum contact with first stage separator 36 through "free product" equalizing valve 32. The vessel is not shown in the figures for simplicity.

Vapor piping 44 is connected high in the vapor portion of separator 36 to minimize moisture intake into vacuum pump 100. As the vapor phase and associated air passes through vacuum pump 100, the vapor and air heats up. This increase in temperature is used by routing heat exchange/discharge piping 58 through separator 36. The use of this heat aids in contaminant removal from the produced water and increases the air's ability to carry contaminants.

The water discharge and the vapor discharge are monitored. Site specific contaminant discharge limits dictate the need for further cleaning of the effluent.

SUMMARY, RAMIFICATIONS, AND SCOPE

Thus the reader will see that the invention provides a simple method for total fluid recovery of contaminants from the ground, water, or ground water. The TFR unit can be coupled to conventional water or monitoring wells to recover contaminants and contaminated water. In the preferred embodiment, the process utilizes an electric motor for prime mover 200, an "off the shelf" check valve for separation valve 12, solenoid valves for control valves, and other equipment as shown in FIG. 1 to formulate the Total Fluid Recovery (TFR) unit. The TFR unit is reliable, easy to maintain, and appears to have a long service life. The TFR unit uses a simple method for water effluent discharge, is constructed of "off the shelf" items for ease of construction, does not require solids removal of the produced water prior to pumping operations, and does not require additional air inlet wells for successful operation. Further, the system does not need make-up water for operation.

While the above description contains many specificities, these should not be construed as limitations on the scope of the invention, but rather as an exemplification of one preferred embodiment thereof. Many other variations are possible. For example, the TFR unit could be connected to a skimmer system for recovery of contaminants from the surface of a body of water. The TFR unit could also be connected to the run-off piping from the floating roof of a floating roof tank for rain water cleaning, and for other general water polishing requirements. Accordingly, the scope of the invention should be determined not by the embodiments illustrated, but by the appended claims and their legal equivalents.

We claim:

1. A process of recovery and separation of well fluids containing volatile and nonvolatile organic compounds from a recovery well by means of a vacuum, comprising:

providing a staged separation system in fluid contact with a recovery well to separate the volatile and nonvolatile compounds and produced air from associated produced water and, providing a simple dry vacuum pump in fluid contact with the staged separation system, providing a means of periodic isolation of the second stage separator so a conventional centrifugal pump connected to said second stage separator can discharge water while the process continuously operates, providing a means of supplying additional air spargers into selective portions of said separation system, providing a means of separating large amounts of compounds from associated produced water, providing a means of simultaneously heating the compounds and associated water in said separation system to enhance separation, whereby a recovery well of conventional water or monitoring well design can be utilized to recover volatile and nonvolatile compounds from the ground or ground water, or both.

2. A process in accordance with claim 1, wherein said vacuum pump is equipped with gaseous phase particulate filtration.

3. A process in accordance with claim 1, wherein the liquid phases can pass through said separation system with associated suspended solids.

4. A process in accordance with claim 1, wherein the liquid phase portion of the stages of said separation system is isolated with the use of simple check valves.

5. A process in accordance with claim 4, wherein the gaseous portion of the stages of said separation system is isolated with the use of controlled valves.

6. A process in accordance with claim 1, wherein said separation system is equipped with a hydrophobic filter.

7. A process in accordance with claim 8, wherein said additional air is supplied continuously and selectively to said separation system.

* * * * *